US 012022320B2

(12) United States Patent
Xin et al.

(10) Patent No.: US 12,022,320 B2
(45) Date of Patent: *Jun. 25, 2024

(54) DATA PROCESSING METHOD AND APPARATUS

(71) Applicant: HUAWEI TECHNOLOGIES CO., LTD., Shenzhen (CN)

(72) Inventors: Yang Xin, Shanghai (CN); Weiwei Chong, Shenzhen (CN); Xiaobo Wu, Shenzhen (CN); Shengxian Nie, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,219

(22) Filed: Nov. 14, 2022

(65) Prior Publication Data

US 2023/0362708 A1    Nov. 9, 2023

Related U.S. Application Data

(63) Continuation of application No. 16/909,034, filed on Jun. 23, 2020, now Pat. No. 11,503,496, which is a
(Continued)

(30) Foreign Application Priority Data

Dec. 28, 2017    (CN) .......................... 201711453765.0

(51) Int. Cl.
*H04W 28/24*    (2009.01)
*H04W 28/02*    (2009.01)

(52) U.S. Cl.
CPC ....... *H04W 28/0268* (2013.01); *H04W 28/24* (2013.01)

(58) Field of Classification Search
CPC .... H04L 45/36; H04L 47/24; H04W 28/0268; H04W 28/24
See application file for complete search history.

(56) References Cited

U.S. PATENT DOCUMENTS

2015/0304865 A1    10/2015  Poscher
2019/0082350 A1*   3/2019   Kim ..................... H04W 68/02
(Continued)

FOREIGN PATENT DOCUMENTS

CN          101562602 A       10/2009
CN          101931936 A       12/2010
(Continued)

OTHER PUBLICATIONS

Huawei, Discussion about Big Data Driven Network Architecture. SA WG2 meeting#121, May 15, 2017, Hangzhou, China, S2-173192, 11 pages.

*Primary Examiner* — Syed Ali
(74) *Attorney, Agent, or Firm* — Rimon PC

(57) ABSTRACT

Embodiments of this application provide a data processing method and apparatus. The method includes: parsing, by a user plane data processing network element, a received packet and determining first service type information of a data flow to which the packet belongs; obtaining, by the user plane data processing network element, second service type information of the data flow from a data analysis network element; and processing, by the user plane data processing network element, the data flow based on the first service type information and the second service type information. With the data processing method and apparatus disclosed herein, accuracy in identifying a service type of transmitted data can be improved.

19 Claims, 8 Drawing Sheets

Related U.S. Application Data continuation of application No. PCT/CN2018/119411, filed on Dec. 5, 2018.

(56) References Cited

U.S. PATENT DOCUMENTS

| | | | |
|---|---|---|---|
| 2019/0082380 A1 | 3/2019 | Gummadi et al. | |
| 2019/0132377 A1* | 5/2019 | Hulick, Jr. | H04L 47/193 |
| 2019/0174360 A1* | 6/2019 | Pang | H04W 28/16 |
| 2020/0296749 A1* | 9/2020 | Freda | H04W 72/20 |
| 2020/0367109 A1* | 11/2020 | Chen | H04W 28/18 |
| 2021/0204301 A1* | 7/2021 | Lee | H04W 72/566 |

FOREIGN PATENT DOCUMENTS

| | | |
|---|---|---|
| CN | 102111814 A | 6/2011 |
| CN | 102271324 A | 12/2011 |
| CN | 102413518 A | 4/2012 |
| CN | 102883457 A | 1/2013 |
| CN | 103813392 A | 5/2014 |
| CN | 104782168 A | 7/2015 |
| CN | 105682014 A | 6/2016 |
| EP | 3691209 A1 | 8/2020 |
| JP | 2016523497 A | 8/2016 |
| WO | 2009102417 A1 | 8/2009 |
| WO | 2015192295 A1 | 12/2015 |
| WO | 2017052154 A1 | 3/2017 |

\* cited by examiner

DATA PROCESSING METHOD AND APPARATUS

CROSS-REFERENCE TO RELATED APPLICATION

This application is a continuation of U.S. patent application Ser. No. 16/909,034, filed on Jun. 23, 2020, now U.S. Pat. No. 11,503,496, which is a continuation of International Application No. PCT/CN2018/119411, filed on Dec. 5, 2018. The International Application claims priority to Chinese Patent Application No. 201711453765.0, filed on Dec. 28, 2017. All of the afore-mentioned patent applications are hereby incorporated by reference in their entireties.

TECHNICAL FIELD

Embodiments of this application relate to the communications field, and in particular, to a data processing method and apparatus.

BACKGROUND

In a communications network, a core network element obtains, from a terminal device or a data network, a service type of transmitted data, to implement differentiated processing on the transmitted data. For example, processing priorities of transmitted data of different service types are different. However, the terminal device or the data network may be attacked maliciously, and consequently, a service type obtained by the core network element is inaccurate. Waste of network resources may be further caused. For example, the network resources are wasted because the network resources cannot be allocated based on a correct priority of the transmitted data.

SUMMARY

Embodiments of this application provide a data processing method and apparatus, to improve accuracy of identifying a service type of transmitted data.

According to a first aspect of this application, a data processing method is provided, including: parsing, by a user plane data processing network element, a received packet and determining first service type information of a data flow to which the packet belongs; obtaining, by the user plane data processing network element, second service type information of the data flow from a data analysis network element; and processing, by the user plane data processing network element, the data flow based on the first service type information and the second service type information. In this method, two pieces of service type information of the data flow are obtained in two manners, so that the obtained service type of the data flow is more accurate. The user plane data processing network element processes the data flow based on the first service type information and the second service type information, so that a problem of network resource waste caused by inaccurate first service type information may be avoided.

In a possible implementation of the first aspect, the obtaining, by the user plane data processing network element, second service type information of the data flow from a data analysis network element includes: obtaining, by the user plane data processing network element, a characteristic parameter corresponding to a packet in the data flow; sending, by the user plane data processing network element, the characteristic parameter to the data analysis network element; and receiving, by the user plane data processing network element, response information of the characteristic parameter from the data analysis network element, where the response information includes the second service type information.

According to a second aspect of this application, a data processing method is provided, including: parsing, by a user plane data processing network element, a received packet and determining first service type information of a data flow to which the packet belongs; determining, by the user plane data processing network element, second service type information of the data flow based on a service identification model; and processing, by the user plane data processing network element, the data flow based on the first service type information and the second service type information. In this method, two pieces of service type information of the data flow are obtained in two manners, so that the obtained service type of the data flow is more accurate. The user plane data processing network element processes the data flow based on the first service type information and the second service type information, so that a problem of network resource waste caused by inaccurate first service type information may be avoided.

In a first possible implementation of the second aspect, the method further includes: receiving, by the user plane data processing network element, description information of the service identification model from a data analysis network element; and generating, by the user plane data processing network element, the service identification model based on the description information. In this method, procedures of interaction between the user plane data processing network element and the data analysis network element may be reduced, and system load may be alleviated.

In any possible implementation of the second aspect, the determining, by the user plane data processing network element, of second service type information of the data flow based on a service identification model includes: obtaining, by the user plane data processing network element, a characteristic parameter corresponding to the packet in the data flow; and determining, by the user plane data processing network element based on the service identification model, second service type information corresponding to the characteristic parameter.

In any possible implementation of the second aspect, the description information of the service identification model includes at least one of feature set information, model parameter set information, and a correspondence between a data type and a data source that correspond to the service identification model.

In a first possible implementation of the first aspect and the second aspect, the parsing, by a user plane data processing network element, a received packet and determining first service type information of a data flow to which the packet belongs includes: extracting, by the user plane data processing network element, the first service type information from the packet by parsing the packet.

In a second possible implementation of the first aspect and the second aspect, the parsing, by a user plane data processing network element, a received packet and determining first service type information of a data flow to which the packet belongs includes: extracting, by the user plane data processing network element, description information of the data flow by parsing the packet; and determining, by the user plane data processing network element, the first service type information based on the description information.

In a third possible implementation of the first aspect and the second aspect, the processing, by the user plane data processing network element, the data flow based on the first service type information and the second service type information includes: adjusting, by the user plane data processing network element, a priority of the data flow when the first service type information is inconsistent with the second service type information. In this method, when it is identified that the first service type information is inconsistent with the second service type information, the priority of the data flow is adjusted in time, so that the waste of network resource caused by inaccurate first service type information may be reduced.

With reference to the third possible implementation of the first aspect and the second aspect, in a fourth possible implementation of the first aspect and the second aspect, the method further includes: sending, by the user plane data processing network element, indication information to an access network device, where the indication information is used to instruct the access network device to adjust the priority of the data flow.

With reference to the fourth possible implementation of the first aspect and the second aspect, in a fifth possible implementation of the first aspect and the second aspect, the sending, by the user plane data processing network element, indication information to an access network device includes: sending, by the user plane data processing network element, a packet to the access network device, where a header of the packet includes the indication information; or sending, by the user plane data processing network element, a first message to a session management network element, where the first message is used to request the session management network element to adjust the priority of the data flow.

With reference to the third possible implementation of the first aspect and the second aspect, in a sixth possible implementation of the first aspect and the second aspect, the user plane data processing network element obtains third service type information that is of the data flow and that is from a terminal device or a data network; and the user plane data processing network element processes the data flow based on the third service type information and at least one of the first service type information and the second service type information. In this method, when it is identified that the first service type information is inconsistent with the second service type information, a check process is introduced, so that the service type of the data flow is identified more accurately.

With reference to the sixth possible implementation of the first aspect and the second aspect, in a seventh possible implementation of the first aspect and the second aspect, the processing, by the user plane data processing network element, the data flow based on the third service type information and at least one of the first service type information and the second service type information includes: restoring, by a user plane processing network element, a priority of the data flow when the first service type information is consistent with the third service type information.

With reference to the sixth possible implementation of the first aspect and the second aspect, in an eighth possible implementation of the first aspect and the second aspect, the processing, by the user plane data processing network element, the data flow based on the third service type information and at least one of the first service type information and the second service type information includes: sending, by the user plane processing network element, report information to an operation support network element when the second service type information is consistent with the third service type information, where the report information includes at least one of information about a service type exception of the data flow and reason information of the service type exception of the data flow.

In a ninth possible implementation of the first aspect and the second aspect, the user plane data processing network element obtains a correspondence between the description information of the data flow and the first service type information.

In a tenth possible implementation of the first aspect and the second aspect, the user plane data processing network element sends the data flow to a terminal device or a data network when the first service type information is consistent with the second service type information.

In an eleventh possible implementation of the first aspect, the method further includes: sending, by the user plane data processing network element, the third service type information to the data analysis network element.

In any possible implementation of the first aspect and the second aspect, the first service type information and/or the second service type information are/is a service type of the data flow; or the first service type information and/or the second service type information are/is an identifier of an application corresponding to the data flow.

According to a third aspect of this application, a data processing method is provided, including: receiving, by a terminal device, request information from a core network element, where the request information is used to request to confirm a service type of a data flow; and sending, by the terminal device to the core network element, service type information that is of the data flow and that is confirmed by the terminal device.

In a first possible implementation of the third aspect, the receiving, by a terminal device, request information from a core network element includes: receiving, by the terminal device, a first packet from a user plane data processing network element, where the first packet includes the request information; and the sending, by the terminal device, service type information of the data flow to the core network element includes: sending, by the terminal device, a second packet to the user plane data processing network element, where the second packet includes the service type information that is of the data flow and that is confirmed by the terminal device.

In a second possible implementation of the third aspect, the receiving, by a terminal device, request information from a core network element includes: receiving, by the terminal device, the request information from a session management network element; and the sending, by the terminal device, service type information of the data flow to the core network element includes: sending, by the terminal device, response information to the session management network element, where the response information includes service type information that is of the data flow and that is confirmed by the terminal device.

In any possible implementation of the third aspect, the request information includes description information of the data flow.

According to a fourth aspect of this application, a data processing method is provided, including: receiving, by a session management network element, a first message from a user plane data processing network element, where the first message is used to adjust a priority of a data flow; and sending, by the session management network element, indication information to an access network device, where the indication information is used to instruct the access network device to adjust the priority of the data flow.

In a first possible implementation of the fourth aspect, the method further includes: receiving, by the session management network element, request information from the user plane data processing network element, where the request information is used to request to confirm a service type of the data flow; sending, by the session management network element, the request information to a terminal device; receiving, by the session management network element, response information from the terminal device, where the response information includes service type information that is of the data flow and that is confirmed by the terminal device; and sending, by the session management network element to the user plane data processing network element, the service type information that is of the data flow and that is confirmed by the terminal device.

In a second possible implementation of the fourth aspect, the first message and/or the indication information include/includes description information of the data flow.

According to a fifth aspect of this application, a data processing apparatus is provided, including: at least one processing unit, configured to: parse a received packet and determine first service type information of a data flow to which the packet belongs; and a transceiver unit, configured to obtain second service type information of the data flow from a data analysis network element; and the at least one processing unit is further configured to process the data flow based on the first service type information and the second service type information.

According to a sixth aspect of this application, a data processing apparatus is provided, including: a storage unit, configured to store a computer instruction; at least one processing unit, configured to perform the following operations based on the computer instruction stored in the storage unit: parsing a received packet and determining first service type information of a data flow to which the packet belongs; determining second service type information of the data flow based on a service identification model; and processing the data flow based on the first service type information and the second service type information.

According to a seventh aspect of this application, a data processing apparatus is provided, including a storage unit, a transceiver unit, and at least one processing unit. The storage unit is configured to store a computer instruction. The at least one processing unit is configured to perform the following operations based on the computer instruction stored in the storage unit: receiving request information from a core network element by using the transceiver unit, where the request information is used to request to confirm a service type of a data flow; and sending, to the core network element by using the transceiver, service type information that is of the data flow and that is confirmed by the terminal device.

According to an eighth aspect of this application, a data processing apparatus is provided, including a storage unit, a transceiver unit, and at least one processing unit. The storage unit is configured to store a computer instruction. The at least one processing unit is configured to perform the following operations based on the computer instruction stored in the storage unit: receiving, by using the transceiver unit, a first message from a user plane data processing network element, where the first message is used to adjust a priority of a data flow; and sending indication information to an access network device by using the transceiver unit, where the indication information is used to instruct the access network device to adjust the priority of the data flow.

According to a ninth aspect of this application, a computer storage medium is provided. The computer-readable storage medium stores an instruction. When run on a computer, the instruction enables the computer to perform any method in the first aspect to the fourth aspect and the possible implementations.

According to a tenth aspect of this application, a computer program product including an instruction is provided. When run on a computer, the computer program product enables the computer to perform any method in the first aspect to the fourth aspect and the possible implementations.

DESCRIPTION OF EMBODIMENTS

The embodiments of this application may further be used in a global system for mobile communications (GSM) network, a wideband code division multiple access (WCDMA) network, a long term evolution (LTE) network, a 5G or a next generation network, a fixed network, a MulteFire network, a home base station network, a mobile network accessed by non-3GPP (such as Wi-Fi), and the like. In this application, an example in which the embodiments of this application are applied to a 5G network is used for description.

Figure 1:
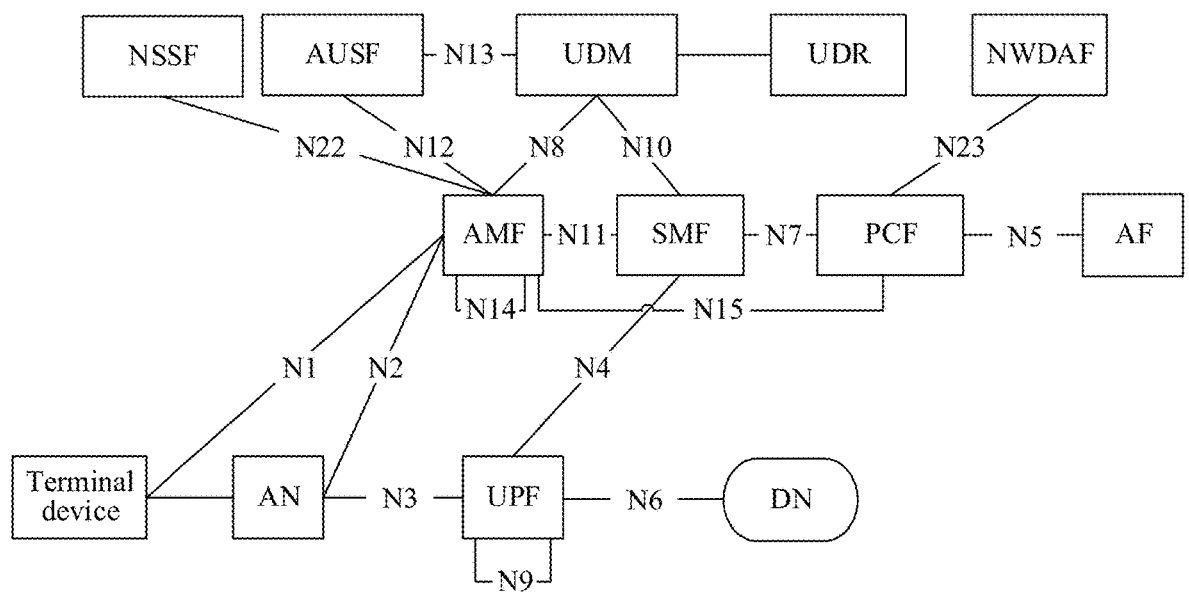
FIG. 1 is a schematic diagram of a communications system for implementing an embodiment of this application.

FIG. 1 is a schematic diagram of a communications system that can implement an embodiment of this application. In the communications system, a terminal device accesses a core network by using an access network (AN) device.

The terminal device includes but is not limited to user equipment (UE), a subscriber unit, a subscriber station, a mobile station, a mobile console, a remote station, a remote terminal device, a mobile terminal device, a user terminal device, a terminal device, a wireless communications device, a user agent, a user apparatus, a cellular phone, a cordless phone, a session initiation protocol (SIP) phone, a wireless local loop (WLL) station, a personal digital assistant (PDA), a handheld device with a wireless communication function, a computing device, a processing device connected to a wireless modem, an in-vehicle device, a wearable device, a terminal device in an Internet of Things, a home appliance, a virtual reality device, a terminal device in a 5G network, a terminal device in a future evolved public land mobile network (PLMN), or the like.

The access network device may be a device that communicates with the terminal device. The access network device may provide communication coverage for a specific geographical area, and may communicate with a terminal device located in the coverage area (cell). The access network device may communicate with any quantity of terminal devices. There may be a plurality of air interface connections between the access network device and the terminal device. For example, there are two air interface connections between the access network device and the terminal device, and the two air interface connections are respectively used to transmit a data flow A and a data flow B. The access network device may support communication protocols with different standards, or may support different communication modes. For example, the access network device may be an evolved NodeB (eNodeB), a wireless fidelity access point (Wi-Fi AP), a worldwide interoperability for microwave access base station (WiMAX BS), or a radio controller in a cloud radio access network (CRAN). Alternatively, the network device may be an access network device in the 5G network, an access network device in the future evolved PLMN, or the like.

The core network may include a user plane function (UPF) network element, an access and mobility management function (AMF) network element, a session management function (SMF) network element, a policy control function (PCF) network element, an application function (AF) network element, a network slice selection function (NSSF) network element, an authentication service function (AUSF) network element, a unified data management (UDM) network element, a unified data repository (UDR) network element, and a network data analytics function (NWDAF) network element. User plane data transmission between the terminal device and a data network (DN) may be implemented by using the access network device and the user plane function network element. Specifically, the DN may be one of an Internet protocol (IP) multimedia subsystem (IMS) server, a packet data network (PDN), an OTT (over the top) server, a vertical industry management and control center, and an application server (App server). In the embodiments of this application, network elements may communicate with each other by using an interface shown in FIG. 1.

In the embodiments of this application, the AMF network element is configured to perform mobility management, lawful interception, access authorization and authentication, or the like. The SMF network element is configured to implement session and bearer management, address allocation, and the like. The PCF network element has a function of policy control decision, and provides a policy for a network. The AF network element is configured to support a network exposure function. The AUSF network element is configured to implement an authentication service function. The NSSF network element is configured to select a network slice. The UDM network element is mainly configured to manage subscription data of a user. The UDR network element is configured to store application data, for example, packet flow description (PDF) information. The NWDAF network element is used for big data learning and analysis.

It may be understood that in the communications system shown in FIG. 1, functions and interfaces of the network elements are merely examples. Not all functions are necessary when the network elements are applied to the embodiments of this application. Functions of the foregoing network elements are not all functions of the network elements.

The method in the embodiments of this application may also be applied to a 5G service-based network architecture.

The term "and/or" in the embodiments of this application is merely an association relationship for describing associated objects and indicates that three relationships may exist. For example, A and/or B may indicate the following three cases: Only A exists, both A and B exist, and only B exists. In addition, in the descriptions of this application, "a plurality of" means two or more than two.

In the embodiments of this application, that a network element (for example, a network element A) obtains information from another network element (for example, a network element B) may indicate that the network element A directly receives the information from the network element B, or may indicate that the network element A receives the information from the network element B through another network element (for example, a network element C). When the network element A receives the information from the network element B through the network element C, the network element C may transparently transmit the information, or may process the information, for example, add the information to different messages for transmission or filter the information, and send only filtered information to the network element A. Similarly, in the embodiments of this application, that the network element A sends the information to the network element B may indicate that the network element A directly sends the information to the network element B, or may indicate that the network element A sends the information to the network element B through another network element (for example, the network element C).

Figure 2:
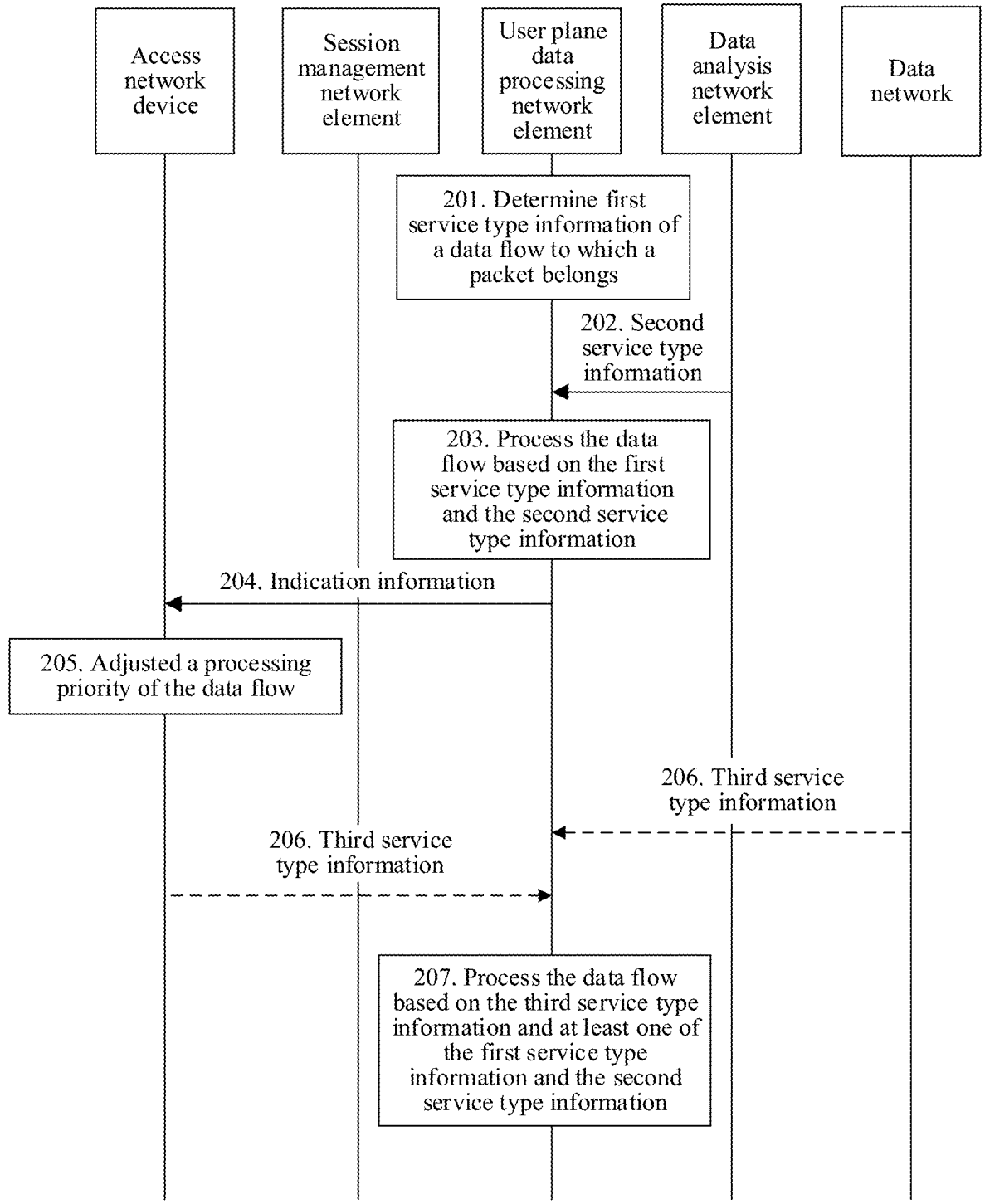
FIG. 2 is a schematic flowchart of a data processing method according to a first embodiment of this application.

FIG. 2 is a schematic flowchart of a data processing method according to a first embodiment of this application. The data processing method includes the following steps.

Step 201. A user plane data processing network element parses a received packet and determines first service type information of a data flow to which the packet belongs.

In this embodiment of this application, the user plane data processing network element may be the UPF network element in FIG. 1. The received packet may be a user plane packet. The user plane data processing network element may receive an uplink packet from a terminal device, or may receive a downlink packet from a data network. In some embodiments, service type information may be a specific service type, or may be identification information of the service type (for example, a number of a service type), or may be application identifier information. This is not limited herein.

In this embodiment, a packet flow is referred to as a data flow for short. The data flow may include at least one transmitted packet. The data flow corresponds to data flow description (PFD) information. The PFD information is used to match a corresponding data flow. Specifically, the PFD information may include PFD identification information and at least one of triplet information, a significant part (significant parts of the URL) of a uniform resource locator (URL), and a host name matching criterion (domain name matching criteria). The triplet information includes a server IP address (server side IP address), a server port (server side port number), and a transmission protocol.

The user plane data processing network element may determine the first service type information of the data flow to which the packet belongs in the following two manners.

Manner 1: The service packet from the terminal device and/or the data network includes the service type information. The user plane data processing network element may extract the service type information by parsing the packet, so that the service type information of the data flow to which the packet belongs may be determined. The service type information determined by the user plane data processing network element is referred to as the first service type information. In some implementations, the service type information may be carried in a header of the packet. The packet may be one of a transmission control protocol (TCP) packet, a user datagram protocol (UDP) packet, or an Internet protocol (IP) packet.

Manner 2: In a service establishment process, for example, in a protocol data unit (PDU) session modification process, a policy control network element sends, to a session management network element by using a policy and charging control (PCC) rule, service type information corresponding to a service, and the session management network element obtains, from a capability exposure function (NEF) network element or a UDR network element based on the service type information, description information of a data flow corresponding to the service type information. After receiving the description information of the data flow, the session management network element associates the description information of the data flow with the service type information, and then sends a correspondence between the description information of the data flow and the service type information to the user plane data processing network element. After receiving the packet, the user plane data processing network element may extract, by parsing the packet, the description information of the data flow to which the packet belongs, for example, at least one of a server IP address, a server port number, and a transmission protocol. The user plane data processing network element may determine, based on the description information that is of the data flow and that is obtained by parsing and the correspondence that is obtained in advance and that is between the description information of the data flow and the service type information of the data flow, the service type information of the data flow to which the packet belongs.

In this embodiment of this application, the policy control network element may be the PCF network element in FIG. 1, and the session management network element may be the SMF network element in FIG. 1.

In some possible implementations, after receiving the description information and the service type information that are of the data flow, the session management network element sends the description information and the service type information that are of the data flow to the user plane data processing network element. The user plane data processing network element associates the description information of the data flow with the service type information of the data flow, to obtain a correspondence between the description information of the data flow and the service type information of the data flow.

In some other possible implementations, the data network may send the description information of the data flow to the policy control network element. The policy control network element sends the description information and the service type information that are of the data flow to the session management network element. The session management network element associates the description information of the data flow with the service type information of the data flow, and then sends the description information and the service type information that are of the data flow to the user plane data processing network element. Alternatively, the session management network element sends the description information and the service type information of the data flow to the user plane data processing network element, and the user plane data processing network element associates the description information of the data flow with the service type information of the data flow. The data network may send the description information of the data flow to the policy control network element by using the AF network element.

In some possible implementations, the description information of the data flow may be all or some of the PFD information, for example, may be at least one of a server IP address, a server port number, and a transmission protocol.

Step 202. The user plane data processing network element obtains second service type information of the data flow from a data analysis network element.

In this embodiment of this application, the data analysis network element may be the NWDAF network element in FIG. 1.

In a possible implementation, the data analysis network element may perform big data analysis on training data in advance to obtain a service identification model. After receiving the packet, the user plane data processing network element obtains a characteristic parameter corresponding to the packet, and then sends the characteristic parameter to the data analysis network element. The data analysis network element inputs the characteristic parameter into the service identification model, to determine the service type information of the data flow to which the packet belongs. The data analysis network element sends response information to the user plane data processing network element, where the response information includes the service type information determined by the data analysis network element. The service type information determined by the data analysis network element is referred to as the second service type information.

For a method for determining, by the data analysis network element, the service type information based on the characteristic parameter, refer to the prior art, or refer to content of the Chinese Patent Application No. 201710915784.4, filed on Sep. 30, 2017.

Step 203. The user plane data processing network element processes the data flow based on the first service type information and the second service type information.

The user plane data processing network element sends the data flow to the terminal device or the data network when determining that the first service type information is consistent with the second service type information. Specifically, if receiving an uplink packet, the user plane data processing network element sends the data flow to which the packet belongs, to the data network. If receiving a downlink packet, the user plane data processing network element sends the data flow to which the packet belongs, to the terminal device.

The user plane data processing network element adjusts a processing priority of the data flow when determining that the first service type information is inconsistent with the second service type information. The user plane data processing network element sends the data flow to the terminal device or the data network based on an adjusted priority. In a possible implementation, the user plane data processing network element adjusts a processing priority of the data flow based on the second service type information. Specifically, the user plane data processing network element may lower or improve the processing priority of the data flow.

In some possible implementations, when the user plane data processing network element determines that the first service type information is inconsistent with the second service type information, step 204 to step 207 in the method in this embodiment may be further performed. A sequence in which step 204 and step 206 are performed is not limited in this embodiment.

Step 204. The user plane data processing network element sends indication information to an access network device.

The indication information is used to instruct the access network device to adjust a priority of the data flow. After receiving the indication information, the access network device adjusts the processing priority of the data flow.

The user plane data processing network element may send the indication information to the access network device in the following two manners.

Manner 1: Send the indication information to the access network device through a user plane.

The user plane data processing network element sends a packet to the access network device, where a header of the packet includes the indication information. In a possible implementation, the content of the packet is empty. The packet may further carry description information of the data flow.

Manner 2: Send the indication information to the access network device through a control plane.

The user plane data processing network element sends a first message to the session management network element, where the first message is used to request the session management network element to adjust a priority of the data flow. After receiving the first message, the session management network element sends a second message to the access network device, where the second message includes the indication information. In some possible implementations, the second message may further include the description information of the data flow. The indication information may be an adjusted priority of the data flow. The second message may include session management information, and the session management information includes the indication information and/or the description information of the data flow.

Step 205. The access network device adjusts a priority of the data flow based on the indication information.

Step 206. The user plane data processing network element obtains third service type information that is of the data flow and that is from a terminal device or a data network.

Specifically, if receiving an uplink packet, the user plane data processing network element sends request information to the data network, where the request information is used to request the data network to confirm a service type of the data flow. After receiving the request information, the data network sends response information of the request information to the user plane data processing network element, where the response information includes the service type information confirmed by the data network for the data flow. The service type information confirmed by the data network for the data flow may be referred to as the third service type information. The request information may further include the description information of the data flow. The data network may confirm the service type of the data flow based on the description information of the data flow.

When receiving a downlink packet, the user plane data processing network element sends the request information to the terminal device, where the request information is used to request the terminal device to confirm the service type of the data flow. After receiving the request information, the terminal device sends the response information to the user plane data processing network element, where the response information includes the service type information confirmed by the terminal device for the data flow. The service type information confirmed by the terminal device for the data flow may be referred to as the third service type information. The request information may further include the description information of the data flow. The terminal device may confirm the service type of the data flow based on the description information of the data flow.

The user plane data processing network element may obtain the third service type information from the terminal device in the following two manners.

Manner 1: Send the request information to the terminal device through a user plane.

The user plane data processing network element sends a packet (for example, a first packet) to the terminal device, where a header of the packet includes the request information. In a possible implementation, the content of the packet is empty. The packet may carry the description information of the data flow. After receiving the request information, the terminal device sends a packet (for example, a second packet) to the user plane data processing network element, where the packet includes the third service type information.

Manner 2: Send the indication information to the access network device through a control plane.

The user plane data processing network element sends a third message to the session management network element, where the third message includes the request information. After receiving the third message, the session management network element sends a fourth message to the terminal device, where the fourth message includes the request information. The third message and/or the fourth message may further include the description information of the data flow. In a possible implementation, the fourth message may include the session management information, and the session management information includes the request information. After receiving the request information, the terminal device sends the response information to the user plane data processing network element, where the response information includes the third service type information.

Step 207. The user plane data processing network element processes the data flow based on the third service type information and at least one of the first service type information and the second service type information.

A user plane processing network element restores the priority of the data flow when the first service type information is consistent with the third service type information. The user plane processing network element sends the data flow to the terminal device or the data network based on a restored priority. In this case, the user plane data processing network element may send the third service type information to a data analysis network element. The third service type information is used by the data analysis network element to update a service identification model. The user plane data processing network element may further send the description information of the data flow to the data analysis network element. The user plane data processing network element may also send the indication information to the access network device, where the indication information is used to instruct the access network device to restore the priority of the data flow. For a specific manner in which the user plane data processing network element sends the indication information to the access network device, refer to step 204. Details are not described herein again.

When the second service type information is consistent with the third service type information, the user plane processing network element maintains the adjusted priority in step 203 or adjusts the priority of the data flow again. The user plane processing network element may even abandon transmission of the data flow. In some possible implementations, the user plane processing network element may further send report information to an operation support network element. The report information includes at least one of information about a service type exception of the data flow and reason information of the service type exception of the data flow. The operation support network element may be at least one of a network exposure function (NEF) network element, an element manager (EM), and an operation support system (OSS). The reason information of the service type exception of the data flow may be that the first service type information is inconsistent with the second service type information. The report information may further include the description information of the data flow. After receiving the report information, the operation support network element feeds back an exception report to a policy control network element.

If the third service type information is inconsistent with both the first service type information and the second service type information, the user plane processing network element may process the data flow with reference to a case in which the second service type information is consistent with the third service type information.

In some implementations, the user plane data processing network element obtains the first service type information confirmed by the user plane data processing network element and the second service type information from the data analysis network element. The service type of the data flow is confirmed by using the two pieces of service type information, so that the obtained service type of the data flow is more accurate. The user plane data processing network element processes the data flow based on the first service type information and the second service type information, so that a problem of network resource waste caused by inaccurate first service type information may be avoided.

In some other implementations, when the first service type information is inconsistent with the second service type information, the user plane data processing network element obtains the third service type information from the terminal device or the data network, and confirms the service type of the data flow by using the three pieces of service type information, thereby further improving accuracy of identifying the service type of the data flow.

In some implementations, the user plane data processing network element adjusts a processing priority of the data flow when the first service type information is inconsistent with the second service type information. Certainly, the user plane data processing network element may alternatively not adjust the processing priority of the data flow first, and after obtaining the third service type information, the user plane data processing network element determines, based on the third service type information, whether to adjust the priority of the data flow. For example, the user plane data processing network element may first buffer a to-be-transmitted data flow when the first service type information is inconsistent with the second service type information. The user plane data processing network element determines the priority of the data flow based on the third service type information, and sends the buffered data flow.

In step 202, the user plane data processing network element obtains the second service type information of the data flow from the data analysis network element. In some other implementations, the user plane data processing network element may also implement some or all functions of the data analysis network element. For example, the data analysis network element may obtain the service identification model of the data flow by performing big data analysis on training data. Then the data analysis network element sends the service identification model to the user plane data processing network element. After receiving the packet, the user plane data processing network element obtains the second service type information by using the service identification model. For another example, the data analysis network element may obtain description information of the service identification model of the data flow by performing big data analysis on the training data. Then the data analysis network element sends the description information of the service identification model to the user plane data processing network element. The user plane data processing network element generates the service identification model based on the description information of the service identification model. After receiving the packet, the user plane data processing network element obtains the second service type information by using the service identification model. The description information includes at least one of feature set information, model parameter set information, and a correspondence between a data type and a data source that correspond to the service identification model.

Figure 3:
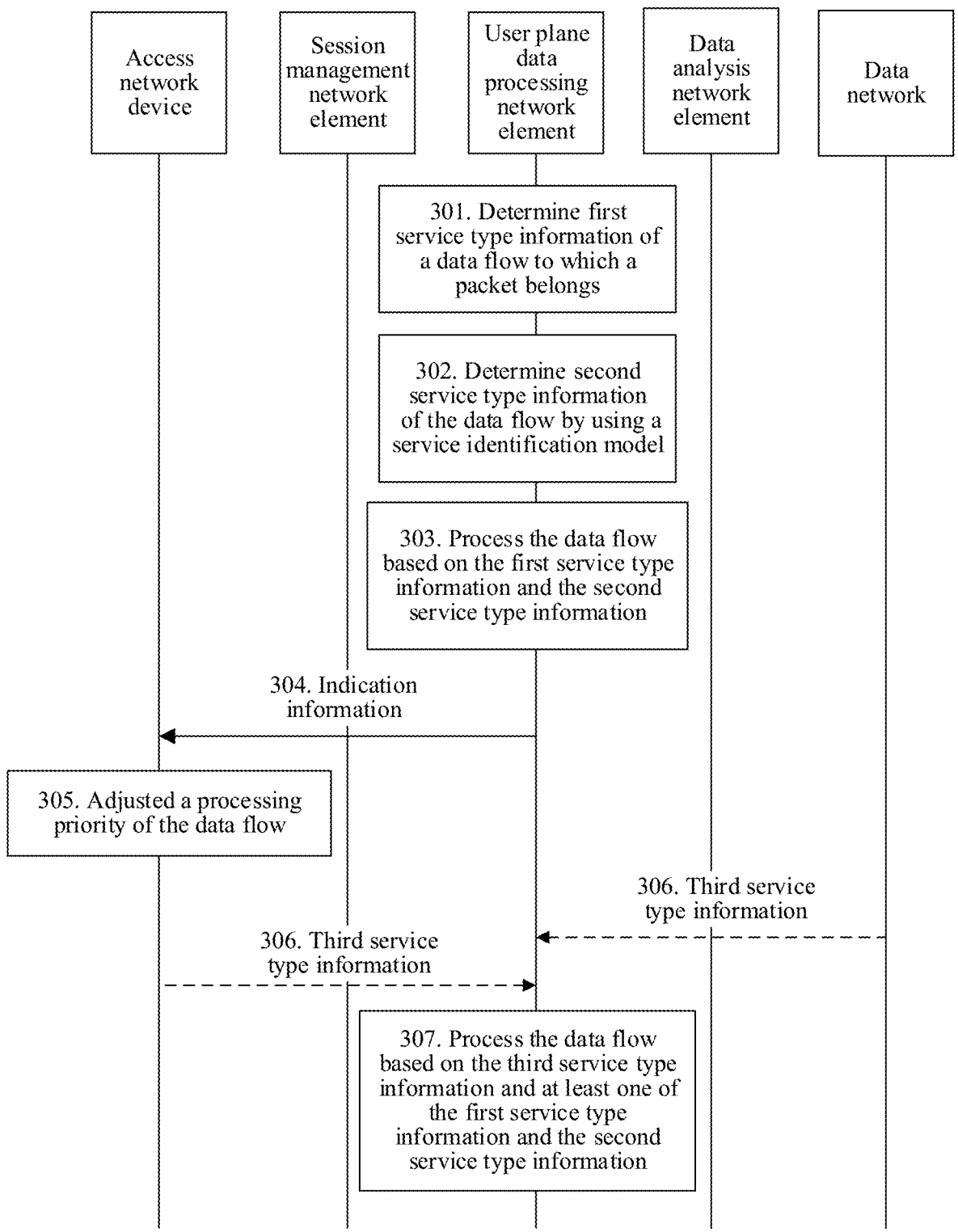
FIG. 3 is a schematic flowchart of a data processing method according to a second embodiment of this application.

Correspondingly, as shown in FIG. 3, a second embodiment of this application provides another data processing method. The method includes the following steps.

Step 301. A user plane data processing network element parses a received packet and determines first service type information of a data flow to which the packet belongs.

For details of this step, refer to the detailed descriptions of step 201.

Step 302. The user plane data processing network element determines second service type information of the data flow by using a service identification model.

Step 303. The user plane data processing network element processes the data flow based on the first service type information and the second service type information. For details of this step, refer to the detailed descriptions of step 203.

Step 303 to step 307: For details, refer to operations in the detailed descriptions of step 203 to step 207.

Figure 4A:
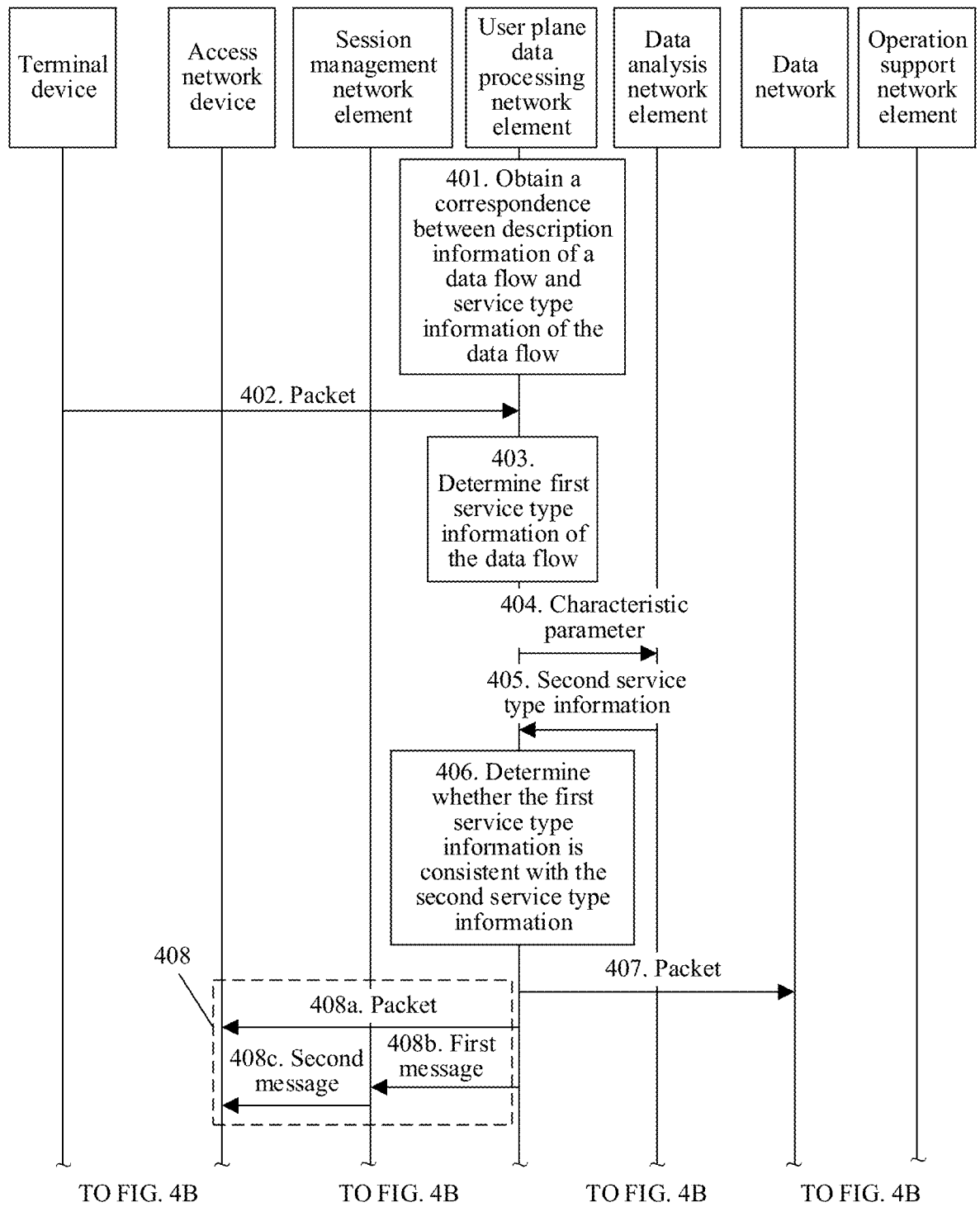
FIG. 4A and FIG. 4B area schematic flowchart of a data processing method according to a third embodiment of this application.
Figure 4B:
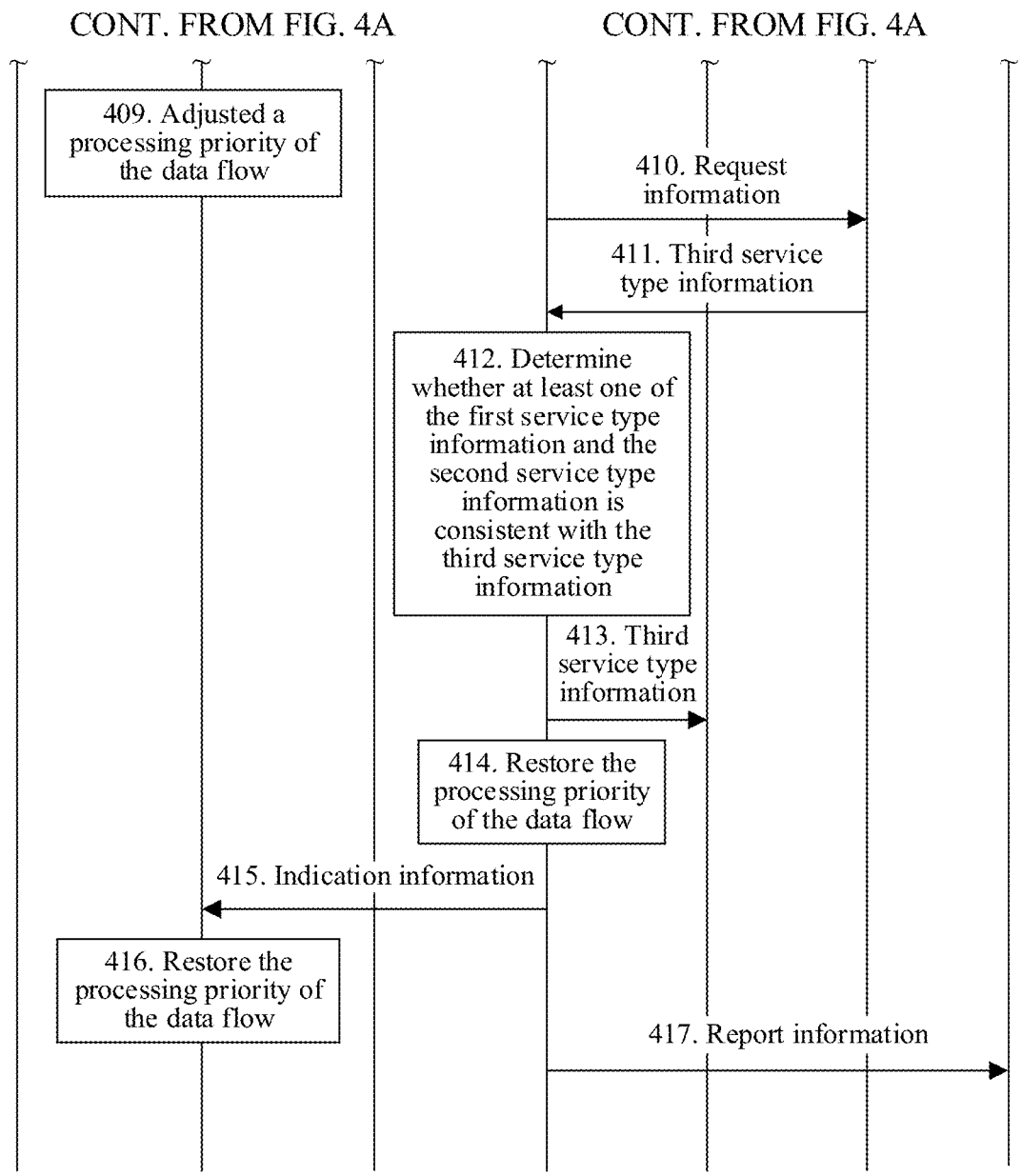

FIG. 4A and FIG. 4B are schematic flowcharts of a data processing method according to a third embodiment of this application. This embodiment is based on the first embodiment, and is described by using an example in which a user plane data processing network element receives uplink data (from a terminal device). The data processing method in this embodiment includes the following steps.

Step 401. The user plane data processing network element obtains a correspondence between description information of a data flow and service type information of the data flow.

In some possible implementations, in a service establishment process, for example, in a PDU session modification process, a policy control network element sends, to a session management network element by using a PCC rule, service type information corresponding to a service. The session management network element obtains, from an NEF network element or an UDR network element based on the service type information, description information that is of the data flow and that corresponds to the service type information. In this embodiment, an example in which the description information of the data flow is PFD information is used for description. After receiving the PFD information, the session management network element associates the PFD information with the service type information, and then sends a correspondence between the PFD information and the service type information to the user plane data processing network element, so that the user plane data processing network element obtains the correspondence between the description information of the data flow and a service type of the data flow.

In some possible implementations, after receiving the PFD information and the service type information, the session management network element sends the PFD information and the service type information to the user plane data processing network element. The user plane data processing network element associates the PFD information with the service type information, to obtain the correspondence between the PFD information and the service type information.

In some possible implementations, the data network may send the PFD information to the policy control network element. The policy control network element sends the PFD information and the service type information to the session management network element. The session management network element associates the PFD information with the service type information, and then sends the PFD information and the service type information to the user plane data processing network element. Alternatively, the session management network element sends the PFD information and the service type information to the user plane data processing network element, and the user plane data processing network element associates the PFD information with the service type information. Optionally, the data network may send the PFD information to the policy control network element by using an AF network element.

When the user plane data processing network element extracts the service type information from a service packet from the terminal device and/or the data network, step 401 may be an optional step.

Step 402. The user plane data processing network element receives a packet from a terminal device.

The packet may be an uplink user plane packet. After receiving the packet, the user plane data processing network element parses the packet.

In some possible implementations, the user plane data processing network element parses the packet, and extracts, from the packet, service type information of a data flow to which the packet belongs, for example, a service type.

In some possible implementations, the user plane data processing network element parses the packet, and extracts, from the packet, description information of the data flow to which the packet belongs, for example, at least one of a server IP address, a server port number, and a transmission protocol.

In some possible implementations, the user plane data processing network element receives a characteristic list or a characteristic index list from the data analysis network element.

The user plane data processing network element obtains a characteristic parameter that corresponds to the packet and that is of the characteristic list or the characteristic index list.

Step 403. The user plane data processing network element determines first service type information of the data flow.

In some possible implementations, if the user plane data processing network element extracts the service type information from the packet, the service type information is determined as the service type information of the data flow to which the packet belongs, that is, the first service type information.

In some possible implementations, if the user plane data processing network element does not extract the service type information from the packet, the user plane data processing network element determines the service type information of the data flow, that is, the first service type information based on the description information that is of the data flow and that is extracted from the packet and the correspondence obtained in step 401.

Step 404. The user plane data processing network element sends the characteristic parameter to the data analysis network element.

Specifically, the user plane data processing network element sends the characteristic parameter obtained in step 402, to the data analysis network element. The characteristic parameter is used by the data analysis network element to determine a service type of the data flow to which the packet belongs.

In this embodiment, step 404 may alternatively be performed before step 403. To be specific, a sequence in which step 403 and step 404 are performed is not limited in this embodiment.

Step 405. The data analysis network element sends second service type information to the user plane data processing network element.

After receiving the characteristic parameter sent in step 404, the data analysis network element determines, based on a service identification model obtained in advance based on a big data analysis method, a service type corresponding to the characteristic parameter, that is, a service type of the data flow to which the packet belongs. The data analysis network element sends the determined service type information to the user plane data processing network element. The service type information may be a specific service type, or may be indication information of the service type, for example, a number of the service type. This is not limited herein.

Step 406. The user plane data processing network element determines whether the first service type information is consistent with the second service type information.

In this embodiment, that the first service type information is consistent with the second service type information may be that the first service type information is the same as the second service type information, or may be that a service type indicated by the first service type information is the same as a service type indicated by the second service type information. This is not limited herein.

Step 407. The user plane data processing network element sends the packet to a data network.

Specifically, if the first service type information is consistent with the second service type information, the user plane data processing network element sends the data flow to which the packet belongs, to the data network. A processing priority of the data flow may remain unchanged. If the first service type information is inconsistent with the second service type information, the user plane data processing network element adjusts a processing priority of the data flow. Then the user plane data processing network element sends the data flow to the data network based on an adjusted priority. In a possible implementation, the user plane data processing network element adjusts the processing priority of the data flow based on the second service type information. Specifically, the user plane data processing network element may lower or improve the processing priority of the data flow. In this embodiment, an example in which the priority is lowered is used for description. For example, the user plane data processing network element may lower the processing priority of the data flow by one level based on pre-configuration. Alternatively, the user plane data processing network element may lower the priority of the data flow based on priority information from the session management network element.

When the first service type information is inconsistent with the second service type information, the user plane data processing network element may further perform the following steps.

Step 408. The user plane data processing network element sends indication information to an access network device.

In this embodiment of this application, the indication information may be first indication information. The indication information is used to instruct the access network device to adjust the priority of the data flow. The user plane data processing network element may send the indication information to the access network device in the following two manners.

Manner 1: Send the indication information to the access network device through a user plane, including:

Step 408a. The user plane data processing network element sends the packet to the access network device.

In a possible implementation, a header of the packet includes the indication information but the content of the packet is empty. The packet may carry the description information of the data flow.

Manner 2: Send the indication information to the access network device through a control plane, including:

Step 408b. The user plane data processing network element sends a first message to a session management network element.

The first message is used to request the session management network element to adjust the priority of the data flow.

Step 408c. The session management network element sends a second message to the access network device.

After receiving the first message, the session management network element determines, based on policy information, an adjusted priority of the data flow. For example, the session management network element may obtain the policy information from the policy control network element. The second message includes the indication information. In some possible implementations, the second message may further include the description information of the data flow. The indication information may be adjusted priority information of the data flow. The second message may include session management information, and the session management information includes the indication information and/or the description information of the data flow. For example, the session management information may be N2 SM information.

Step 409. The access network device adjusts the priority of the data flow.

Specifically, after receiving the indication information in step 408, the access network device adjusts, based on the indication information, the processing priority of the data flow corresponding to the packet.

When the first service type information is inconsistent with the second service type information, to further improve accuracy of identifying the service type, a check process may further be introduced in this embodiment. For details, refer to the following steps.

Step 410. The user plane data processing network element sends request information to the data network.

The request information is used to request the data network to confirm the service type of the data flow. The request information may further include the description information of the data flow. The data network may confirm the service type of the data flow based on the description information of the data flow.

A sequence in which step 407, step 408, and step 410 are performed is not limited in this embodiment.

Step 411. The data network sends third service type information to the user plane data processing network element.

After receiving the request information, the data network sends response information of the request information to the user plane data processing network element, where the response information includes the service type information confirmed by the data network for the data flow, that is, the third service type information. The response information may further include the description information of the data flow.

Step 412. The user plane data processing network element determines whether at least one of the first service type information and the second service type information is consistent with the third service type information.

If the first service type information is consistent with the third service type information, step 413 to step 416 are performed. If the second service type information is consistent with the third service type information, step 417 is performed.

Step 413. The user plane data processing network element sends the third service type information to the data analysis network element.

The third service type information is used by the data analysis network element to update a service identification model.

Step 414. The user plane processing network element restores the priority of the data flow.

In a possible implementation, the user plane processing network element restores the priority of the data flow before step 407. The user plane processing network element sends the data flow to the data network based on a restored priority.

Step 415. The user plane data processing network element sends the indication information to the access network device.

In this embodiment of this application, the indication information may be second indication information. The indication information is used to instruct the access network device to restore the priority of the data flow. For a specific manner in which the user plane data processing network element sends the indication information to the access network device, refer to the description in step 408.

Step 416. The access network device restores the priority of the data flow.

Specifically, after receiving the indication information in step 415, the access network device restores, based on the indication information, the processing priority of the data flow corresponding to the packet.

A sequence in which step 413, step 414, and step 415 are performed is not limited in this embodiment.

Step 417. The user plane processing network element sends report information to an operation support network element.

The report information includes at least one of information about a service type exception of the data flow and reason information of the service type exception of the data flow. The reason information of the service type exception of the data flow may be that the first service type information is inconsistent with the second service type information. The report information may further include the description information of the data flow.

After receiving the report information, the operation support network element feeds back an exception report to a policy control network element.

In some possible implementations, if the second service type information is consistent with the third service type information, the user plane processing network element maintains the adjusted priority in step 407 or adjusts the priority of the data flow again. The user plane processing network element may even abandon transmission of the data flow.

In some possible implementations, if the third service type information is inconsistent with both the first service type information and the second service type information, the user plane processing network element may perform the operation in step 417.

In this embodiment, if the first service type information is inconsistent with the second service type information, the user plane data processing network element adjusts the priority of the data flow (step 407 to step 409), and then executes the check process (step 410 to step 412). In some other implementations, when the first service type information is inconsistent with the second service type information, the user plane data processing network element may alternatively not adjust the priority of the data flow (that is, not performing step 407 to step 409), but first perform the check process, and adjust the priority of the data flow based on a check result.

In this embodiment, in step 404 and step 405, the user plane data processing network element obtains the second service type information of the data flow from the data analysis network element. In some other implementations, the user plane data processing network element may alternatively obtain the service identification model or description information of the service identification model from the data analysis network element in advance. After receiving the packet, the user plane data processing network element obtains the second service type information by using the service identification model. In this manner, a data processing process may be simplified. For example, procedures of interaction between the user plane data processing network element and the data analysis network element may be simplified, and system load may be alleviated.

Figure 5A:
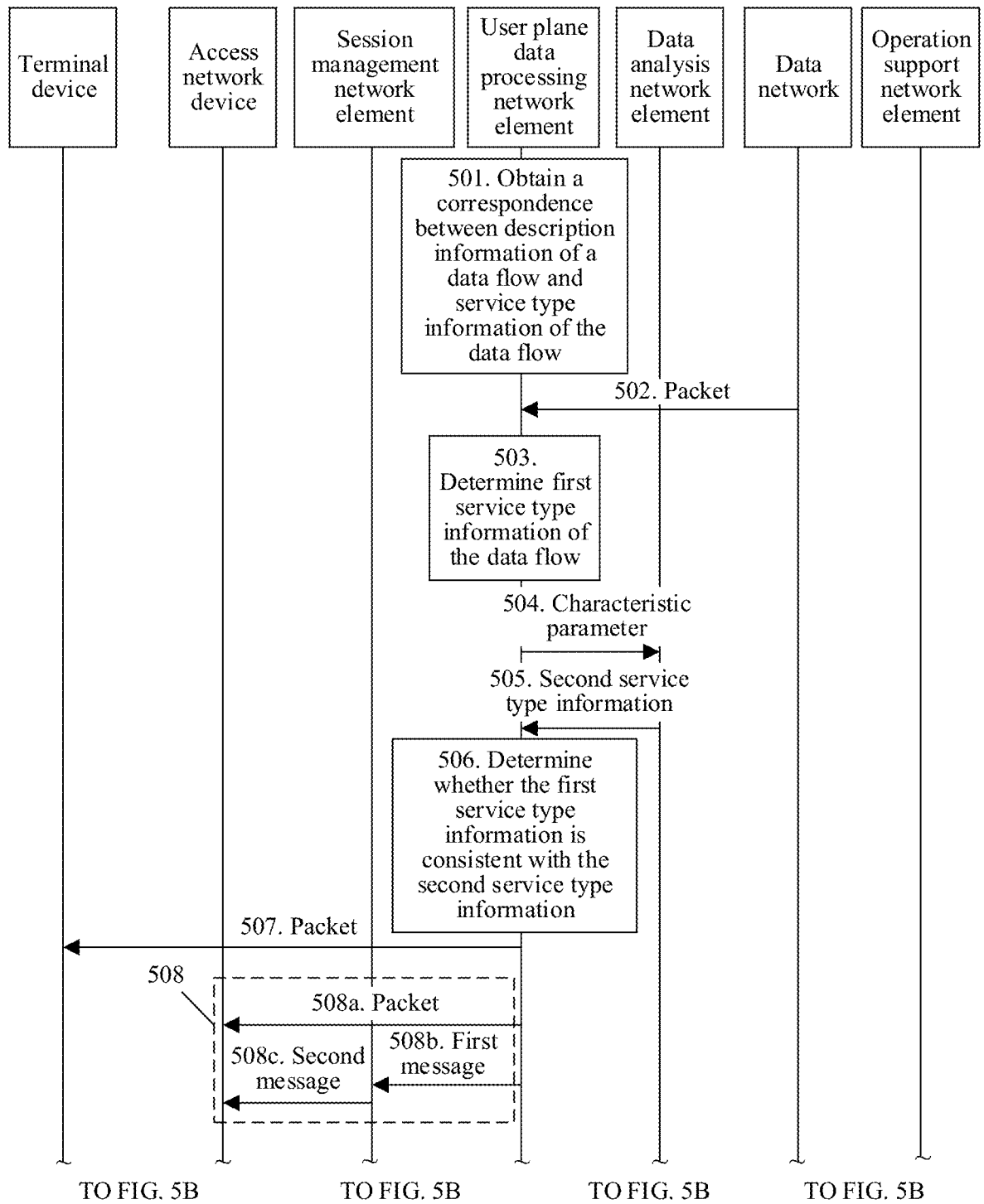
FIG. 5A and FIG. 5B are a schematic flowchart of a data processing method according to a fourth embodiment of this application.
Figure 5B:
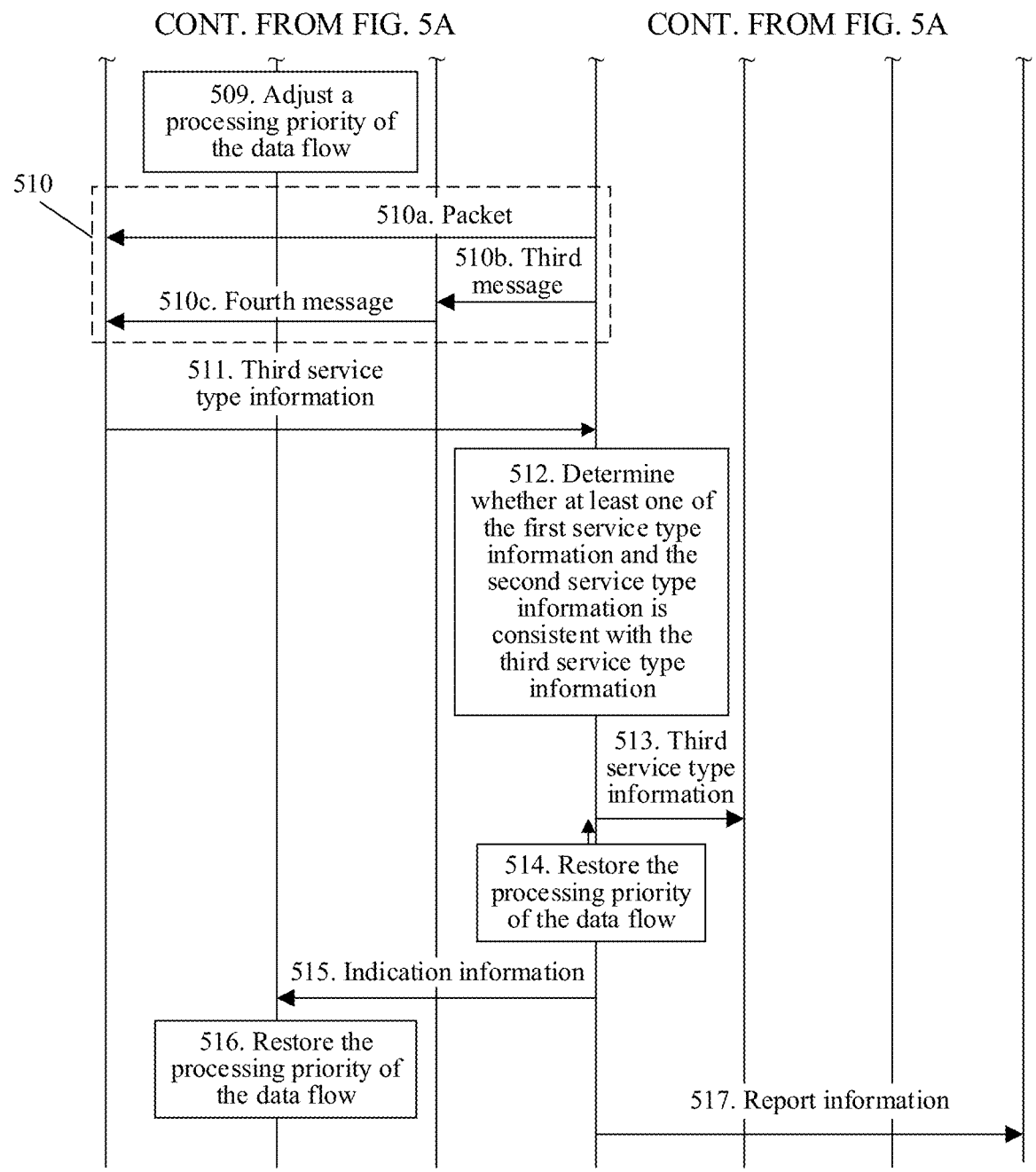

FIG. 5A and FIG. 5B are schematic flowcharts of a data processing method according to a fourth embodiment of this application. This embodiment is based on the first embodiment, and is described by using an example in which a user plane data processing network element receives downlink data (from a data network). The data processing method in this embodiment includes the following steps.

Step 501. The user plane data processing network element obtains a correspondence between description information of a data flow and service type information of the data flow.

For details of this step, refer to the detailed descriptions of step 401.

Step 502. The user plane data processing network element receives a packet from the data network.

The packet may be a downlink user plane packet. After receiving the packet, the user plane data processing network element parses the packet. For a specific parsing method, refer to the detailed descriptions of step 402.

Step 503 to step 506: For details, refer to the detailed descriptions of step 403 to step 406.

Step 507. The user plane data processing network element sends the packet to a terminal device.

Specifically, if the first service type information is consistent with the second service type information, the user plane data processing network element sends a data flow to which the packet belongs, to the terminal device. A processing priority of the data flow may remain unchanged. If the first service type information is inconsistent with the second service type information, the user plane data processing network element adjusts a processing priority of the data flow. The user plane data processing network element sends the data flow to the terminal device based on an adjusted priority. In a possible implementation, the user plane data processing network element adjusts the processing priority of the data flow based on the second service type information. The user plane data processing network element may lower or improve the processing priority of the data flow.

When the first service type information is inconsistent with the second service type information, the user plane data processing network element may further perform the following steps.

Step 508. The user plane data processing network element sends indication information to an access network device.

For details of this step, refer to the detailed descriptions of step 408.

Step 509. The access network device adjusts a priority of the data flow.

For details of this step, refer to the detailed descriptions of step 508.

Step 510. The user plane data processing network element sends request information to the terminal device.

The request information is used to request confirmation of a service type of the data flow. The user plane data processing network element may send the request information to the terminal device in the following two manners.

Manner 1: Send the request information to the terminal device through a user plane, including:

Step 510a. The user plane data processing network element sends the packet to the terminal device.

The packet may be referred to as a first packet. In a possible implementation, a header of the packet includes the request information, but the content of the packet is empty. The header of the packet may carry the description information of the data flow.

Manner 2: Send the request information to the terminal device through a control plane, including:

Step 510b. The user plane data processing network element sends a third message to a session management network element.

The third message includes the request information. The third message may further include the description information of the data flow.

Step 510c. The session management network element sends a fourth message to the terminal device.

After receiving the third message, the session management network element sends the fourth message to the terminal device. The fourth message includes the request information. The fourth message may further include the description information of the data flow. In a possible implementation, the fourth message may include session management information, and the session management information includes the request information and/or the description information of the data flow. For example, the session management information may be an N1 SM container.

Step 511. The terminal device sends third service type information to the user plane data processing network element.

After receiving the request information, the terminal device sends response information to the user plane data processing network element, where the response information includes the service type information confirmed by the terminal device for the data flow, that is, the third service type information. The response information may further include the description information of the data flow.

Corresponding to the two manners of sending the request information in step 510, the third service type information may also be sent in the following two manners.

Manner 1: Send the third service type information to the user plane data processing network element through the user plane, including:

after receiving the request information, the terminal device sends the packet to the user plane data processing network element. The packet may be referred to as a second packet. The packet includes the third service type information. In a possible implementation, the content of the packet is empty. But the header of the packet may further carry the description information of the data flow.

Manner 2: Send the third service type information to the user plane data processing network element through the control plane, including:

after receiving the request information, the terminal device sends the response information to the user plane data processing network element, where the response information includes the third service type information. In a possible implementation, the response information may include the session management information, and the session management information includes the third service type information and/or the description information of the data flow. For example, the session management information may be the N1 SM container.

Step 513 to step 517: For details, refer to the detailed descriptions of step 413 to step 417.

In this embodiment, if the first service type information is inconsistent with the second service type information, the user plane data processing network element adjusts the priority of the data flow (step 507 to step 509), and then executes a check process (step 510 to step 512). In some other implementations, when the first service type information is inconsistent with the second service type information, the user plane data processing network element may alternatively not adjust the priority of the data flow (that is, not perform step 507 to step 509), but first perform the check process, and adjust the priority of the data flow based on a check result.

In this embodiment, in step 504 and step 505, the user plane data processing network element obtains the second service type information of the data flow from the data analysis network element. In some other implementations, the user plane data processing network element may alternatively obtain the service identification model or description information of the service identification model from the data analysis network element in advance. After receiving the packet, the user plane data processing network element obtains the second service type information by using the service identification model. In this manner, a data processing process may be simplified. For example, procedures of interaction between the user plane data processing network element and the data analysis network element may be reduced, and system load may be alleviated.

Figure 6:
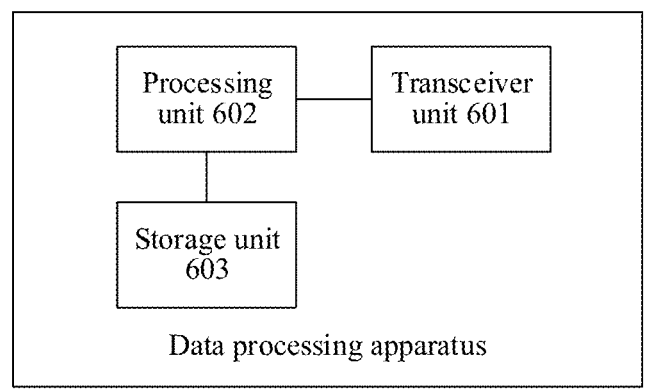
FIG. 6 is a schematic diagram of a data processing apparatus according to an embodiment of this application.

FIG. 6 is a schematic diagram of a data processing apparatus according to an embodiment of this application. The data processing apparatus includes at least one transceiver unit 601 (only one transceiver unit 601 is shown in FIG. 6), a processing unit 602, and a storage unit 603. The transceiver unit 601, the processing unit 602, and the storage unit 603 may be physically separated units, or may be integrated into one or more physical units. This is not limited herein.

The transceiver unit 601 is configured to implement content exchange between the processing unit 602 and another unit or network element. Specifically, the transceiver unit 601 may be a communications interface of the data processing apparatus, a transceiver circuit or a transceiver, or a transceiver machine. The transceiver unit 601 may further be a communications interface or a transceiver circuit of the processing unit 602. Optionally, the transceiver unit 601 may be a transceiver chip.

Although FIG. 6 shows only one transceiver unit 601, the data processing apparatus may also include a plurality of transceiver units 601, or the transceiver unit 601 includes a plurality of sub transceiver units. The transceiver unit 601 may further include a sending unit and a receiving unit.

The processing unit 602 is configured to implement data processing performed by the data processing apparatus. The processing unit 602 may be a processing circuit or may be a processor. The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

Although FIG. 6 shows only one processing unit 602, the data processing apparatus may also include a plurality of processing units, or the processing unit 602 includes a plurality of sub data processing units. Specifically, the processor may be a single-core (single-CPU) processor, or may be a multi-core (multi-CPU) processor.

The storage unit 603 is configured to store a computer instruction to be executed by the processing unit 602. The storage unit 603 may be a storage circuit or may be a memory. The memory may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache.

The storage unit 603 may be a unit independent of the processing unit 602, or may be a storage unit in the processing unit 602. This is not limited herein. Although FIG. 6 shows only one storage unit 603, the data processing apparatus may also include a plurality of storage units 603, or the storage unit 603 includes a plurality of sub storage units.

In the embodiments of this application, the processing unit 602 may exchange content with another network element by using the transceiver unit 601. For example, the processing unit 602 obtains or receives content from another network element. If the processing unit 602 and the transceiver unit 601 are two physically separated components, the processing unit 602 may exchange content with another unit within the data processing apparatus without using the transceiver unit 601.

In a possible implementation, the transceiver unit 601, the processing unit 602, and the storage unit 603 may be connected to each other via a bus. The bus may be a peripheral component interconnect (PCI) bus, an extended industry standard architecture (EISA) bus, or the like. The bus may be classified into an address bus, a data bus, a control bus, and the like.

In this embodiment of this application, when the data processing apparatus is different network elements, the transceiver unit 601, the processing unit 602, and the storage unit 603 may use different forms. This is not limited herein. For example, when the data processing apparatus is a user plane data processing network element, the transceiver unit 601 may be a communications interface or a transceiver circuit. When the data processing apparatus is a terminal device, the transceiver unit 601 may be a transceiver or the transceiver circuit.

In this embodiment of this application, the processing unit 602 enables, based on the computer instruction stored in the storage unit 603, the data processing apparatus to implement the method in the first embodiment to the fourth embodiment of this application.

Specifically, the data processing apparatus may be the user plane data processing network element, for example, an UPF network element. Alternatively, the data processing apparatus may be a session management network element, for example, an SMF network element. The data processing apparatus may further be the terminal device.

When the data processing apparatus is the user plane data processing network element, according to one aspect, at least one processing unit 602 in the data processing apparatus is configured to parse a received packet and determine first service type information of a data flow to which the packet belongs. The transceiver unit 601 is configured to obtain second service type information of the data flow from a data analysis network element. The at least one processing unit 602 is further configured to process the data flow based on the first service type information and the second service type information.

In some possible implementations, the at least one processing unit 602 is further configured to obtain a characteristic parameter corresponding to the packet in the data flow. The transceiver unit 601 is further configured to send the characteristic parameter to the data analysis network element. The transceiver unit 601 is specifically configured to receive response information of the characteristic parameter from the data analysis network element, where the response information includes the second service type information.

In some possible implementations, the at least one processing unit 602 is configured to extract the first service type information from the packet by parsing the packet.

In some possible implementations, the at least one processing unit 602 is configured to extract description information of the data flow by parsing the packet, and determine the first service type information based on the description information.

In some possible implementations, the at least one processing unit 602 is configured to adjust a priority of the data flow when the first service type information is inconsistent with the second service type information.

In some possible implementations, the transceiver unit 601 is further configured to send indication information to an access network device, where the indication information is used to instruct the access network device to adjust the priority of the data flow.

In some possible implementations, the transceiver unit 601 is configured to send a packet to the access network device, where a header of the packet includes the indication information; or the transceiver unit 601 is configured to send a first message to the session management network element, where the first message is used to request the session management network element to adjust the priority of the data flow.

In some possible implementations, the transceiver unit 601 is further configured to obtain third service type information that is of the data flow and that is from the terminal device or a data network. The at least one processing unit 602 is further configured to process the data flow based on the third service type information and at least one of the first service type information and the second service type information.

In some possible implementations, the transceiver unit 601 is further configured to send report information to an operation support network element when the second service type information is consistent with the third service type information, where the report information includes at least one of information about a service type exception of the data flow and reason information of the service type exception of the data flow.

In some possible implementations, the transceiver unit 601 is further configured to send the data flow to the terminal device or the data network when the first service type information is consistent with the second service type information.

In some possible implementations, the transceiver unit 601 is further configured to obtain a correspondence between the description information of the data flow and the first service type information.

In some possible implementations, the at least one processing unit 602 is further configured to obtain a characteristic parameter corresponding to the packet in the data flow. The transceiver unit 601 is further configured to send the characteristic parameter to the data analysis network element. The transceiver unit 601 is configured to receive response information of the characteristic parameter from the data analysis network element, where the response information includes the second service type information.

In some possible implementations, the at least one processing unit 602 is configured to restore the priority of the data flow when the first service type information is consistent with the third service type information.

In some possible implementations, the transceiver unit 601 is further configured to send the third service type information to the data analysis network element.

In some possible implementations, the first service type information and/or the second service type information are/is a service type of the data flow; or the first service type information and/or the second service type information are/is an identifier of an application corresponding to the data flow.

Specifically, the transceiver unit 601 is further configured to implement operations of receiving and sending content of the user plane data processing network element and an external network element in the first embodiment, the third embodiment, and the fourth embodiment of this application. The at least one processing unit 602 may implement, by using the transceiver unit 601, an operation of receiving and sending content of the external network element.

According to the other aspect, the at least one processing unit 602 may perform, based on the computer instruction stored in the storage unit 603, operations performed by the user plane data processing network element in the first embodiment, the third embodiment, and the fourth embodiment of this application.

Specifically, the at least one processing unit 602 performs the following operations based on the computer instruction stored in the storage unit 603: parsing a received packet and determining first service type information of a data flow to which the packet belongs; obtaining second service type information of the data flow from a data analysis network element by using the transceiver unit 601; and processing the data flow based on the first service type information and the second service type information.

When the data processing apparatus is the user plane data processing network element, in another data processing apparatus provided in this embodiment, the at least one processing unit 602 performs the following operations based on the computer instruction stored in the storage unit 603: parsing a received packet and determining first service type information of a data flow to which the packet belongs; determining second service type information of the data flow based on a service identification model; and processing the data flow based on the first service type information and the second service type information.

In some possible implementations, the at least one processing unit 602 is further configured to perform the following operations based on the computer instruction stored in the storage unit: receiving, by using the transceiver unit 601, description information of the service identification model from the data analysis network element; and generating the service identification model based on the description information.

In some possible implementations, the determining second service type information of the data flow based on a service identification model includes obtaining a characteristic parameter corresponding to the packet in the data flow; and determining, based on the service identification model, the second service type information corresponding to the characteristic parameter.

In some possible implementations, the description information includes at least one of feature set information, model parameter set information, and a correspondence between a data type and a data source that correspond to the service identification model.

When the data processing apparatus is another user plane data processing network element, the transceiver unit 601 is further configured to implement operations of receiving and sending content of the user plane data processing network element and an external network element in the second embodiment, the third embodiment, and the fourth embodiment of this application. The at least one processing unit 602 may implement, by using the transceiver unit 601, an operation of receiving and sending content of the external network element.

When the data processing apparatus is the session management network element, the at least one processing unit 602 of the data processing apparatus is configured to perform the following operations based on the computer instruction stored in the storage unit 603: receiving, by using the transceiver unit 601, a first message from the user plane data processing network element, where the first message is used to adjust a priority of a data flow; and sending indication information to an access network device by using the transceiver unit 601, where the indication information is used to instruct the access network device to adjust a priority of the data flow.

In some possible implementations, the at least one processing unit 602 is further configured to perform the following operations based on the computer instruction stored in the storage unit: receiving, by using the transceiver unit 601, request information from the user plane data processing network element, where the request information is used to request to confirm a service type of the data flow; sending the request information to a terminal device by using the transceiver unit 601; receiving, by using the transceiver unit 601, response information from the terminal device, where the response information includes service type information that is of the data flow and that is confirmed by the terminal device; and sending, to the user plane data processing network element by using the transceiver unit 601, the service type information that is of the data flow and that is confirmed by the terminal device.

In some possible implementations, the first message and/or the indication information include/includes description information of the data flow.

Specifically, the transceiver unit 601 is further configured to implement operations of receiving and sending content of the session management network element and an external network element in the first embodiment to the fourth embodiment of this application. The at least one processing unit 602 may implement, by using the transceiver unit 601, an operation of receiving and sending content of the external network element.

When the data processing apparatus is the terminal device, the at least one processing unit 602 performs the following operations based on the computer instruction stored in the storage unit: receiving request information from a core network element by using the transceiver unit 601, where the request information is used to request to confirm a service type of a data flow; and sending, to the core network element by using the transceiver unit 601, the service type information that is of the data flow and that is confirmed by the terminal device.

In some possible implementations, the receiving request information from a core network element by using the transceiver unit 601 includes receiving a first packet from a user plane data processing network element by using the transceiver unit 601, where the first packet includes the request information. The sending to the core network element by using the transceiver unit 601 of the service type information that is of the data flow and that is confirmed by the terminal device includes sending a second packet to the user plane data processing network element by using the transceiver unit 601, where the second packet includes the service type information that is of the data flow and that is confirmed by the terminal device.

In some possible implementations, the receiving request information from a core network element by using the transceiver unit 601 includes receiving the request information from a session management network element by using the transceiver unit 601. The sending, to the core network element by using the transceiver unit 601, the service type information that is of the data flow and that is confirmed by the terminal device includes sending response information to the session management network element by using the transceiver unit 601, where the response information includes the service type information that is of the data flow and that is confirmed by the terminal device.

In some possible implementations, the request information includes description information of the data flow.

Specifically, the transceiver unit 601 is further configured to implement operations of receiving and sending content of the terminal device and an external network element in the first embodiment to the fourth embodiment of this application. The at least one processing unit 602 may implement, by using the transceiver unit 601, an operation of receiving and sending content of the external network element.

In the embodiments of this application, for ease of understanding, a plurality of examples are used for description. However, the examples are merely used for illustration, and do not necessarily represent optimal implementations for implementing this application.

In the embodiments of this application, for ease of description, names of the request information, the response information, and other information are used. However, the information merely describes, by giving examples, content that requires to be carried or functions that require to be implemented, a specific name of the information is not limited in this application. For example, the specific name of the information may further be first information, second information, or third information. The information may be specific information, or may be some fields in a message. The information may further indicate various service-based operations.

In the embodiments of this application, the core network element may be a network element of a physical entity, or may be a virtualized network element. This is not limited herein.

All or some of the foregoing embodiments may be implemented by using software, hardware, firmware, or any combination thereof. When the software is used to implement the embodiments, the embodiments may be implemented partially in a form of a computer program product. The computer program product may include one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A data processing method, comprising:
parsing, by a user plane data processing network element, a received packet and determining first service type information of a data flow to which the packet belongs;
obtaining, by the user plane data processing network element, second service type information of the data flow from a data analysis network element;
obtaining, by the user plane data processing network element, third service type information that is of the data flow and that is from a terminal device or a data network;
processing, by the user plane data processing network element, the data flow based on the first service type information and the second service type information;
processing, by the user plane data processing network element, the data flow based on the third service type information and at least one of the first service type information and the second service type information; and
adjusting, by the user plane data processing network element, a priority of the data flow when the first service type information is inconsistent with the second service type information.

2. The method according to claim 1, wherein the parsing, by the user plane data processing network element, the received packet and determining first service type information of the data flow to which the packet belongs comprises:
extracting, by the user plane data processing network element, the first service type information from the packet by parsing the packet.

3. The method according to claim 1, wherein the parsing, by the user plane data processing network element, the received packet and the determining the first service type information of the data flow to which the packet belongs comprises:
extracting, by the user plane data processing network element, description information of the data flow by parsing the packet; and determining, by the user plane data processing network element, the first service type information based on the description information.

4. The method according to claim 3, further comprising:
obtaining, by the user plane data processing network element, a correspondence between the description information of the data flow and the first service type information.

5. The method according to claim 1, further comprising:
sending, by the user plane data processing network element, indication information to an access network device, wherein the indication information is used to instruct the access network device to adjust the priority of the data flow.

6. The method according to claim 5, wherein
the sending, by the user plane data processing network element, indication information to an access network device comprises:
sending, by the user plane data processing network element, a packet to the access network device, wherein a header of the packet comprises the indication information; or
sending, by the user plane data processing network element, a first message to a session management network element, wherein the first message is used to request the session management network element to adjust the priority of the data flow.

7. The method according to claim 1, wherein the processing, by the user plane data processing network element, the data flow based on the third service type information and at least one of the first service type information and the second service type information comprises:
restoring, by the user plane data processing network element, the priority of the data flow when the first service type information is consistent with the third service type information.

8. The method according to claim 1, wherein the processing, by the user plane data processing network element, the data flow based on the third service type information and at least one of the first service type information and the second service type information comprises:
sending, by the user plane processing network element, report information to an operation support network element when the second service type information is consistent with the third service type information, wherein the report information comprises at least one of information about a service type exception of the data flow or reason information of the service type exception of the data flow.

9. The method according to claim 1, wherein
the obtaining, by the user plane data processing network element, second service type information of the data flow from a data analysis network element comprises:
obtaining, by the user plane data processing network element, a characteristic parameter corresponding to the packet in the data flow;
sending, by the user plane data processing network element, the characteristic parameter to the data analysis network element; and
receiving, by the user plane data processing network element, response information of the characteristic parameter from the data analysis network element, wherein the response information comprises the second service type information.

10. The method according to claim 1, further comprising:
receiving, by a session management network element, a first message from the user plane data processing network element; and
sending, by the session management network element, indication information to an access network device, wherein the indication information is used to instruct the access network device to adjust the priority of the data flow.

11. The method according to claim 10, further comprising:
receiving, by the session management network element, request information from the user plane data processing network element, wherein the request information is used to request to confirm a service type of the data flow;
sending, by the session management network element, the request information to a terminal device;
receiving, by the session management network element, response information from the terminal device, wherein the response information includes service type information that is of the data flow and that is confirmed by the terminal device; and
sending, by the session management network element to the user plane data processing network element, the service type information that is of the data flow and that is confirmed by the terminal device.

12. The method according to claim 10, wherein the first message comprises description information of the data flow.

13. The method according to claim 10, wherein the indication information comprises description information of the data flow.

14. An apparatus, comprising:
at least one processor coupled with a memory, wherein the at least one processor is configured to execute instructions stored in the memory, to enable the apparatus to perform the following operations:
parsing a received packet and determining first service type information of a data flow to which the packet belongs;
obtaining second service type information of the data flow from a data analysis network element;
obtaining third service type information that is of the data flow and that is from a terminal device or a data network;
processing the data flow based on the first service type information and the second service type information;
processing the data flow based on the third service type information and at least one of the first service type information and the second service type information; and
adjusting a priority of the data flow when the first service type information is inconsistent with the second service type information.

15. The apparatus according to claim 14, wherein the parsing the received packet and determining first service type information of the data flow to which the packet belongs comprises:
extracting the first service type information from the packet by parsing the packet.

16. The apparatus according to claim 14, wherein the parsing the received packet and the determining of the first service type information of the data flow to which the packet belongs comprises:
extracting description information of the data flow by parsing the packet; and
determining the first service type information based on the description information.

17. The apparatus according to claim 14, wherein the operations further comprise:
  sending indication information to an access network device, wherein the indication information is used to instruct the access network device to adjust the priority of the data flow.

18. The apparatus according to claim 14, wherein the processing the data flow based on the third service type information and at least one of the first service type information and the second service type information comprises:
  restoring the priority of the data flow when the first service type information is consistent with the third service type information.

19. A system, comprising:
  a user plane data processing network element, wherein the user plane data processing network element comprises a memory and a processor coupled to the memory, the processor being configured to:
    parse a received packet and determine first service type information of a data flow to which the packet belongs,
    obtain second service type information of the data flow,
    obtain third service type information that is of the data flow and that is from a terminal device or a data network,
    process the data flow based on the first service type information and the second service type information,
    process the data flow based on the third service type information and at least one of the first service type information and the second service type information, and
    adjust a priority of the data flow when the first service type information is inconsistent with the second service type information; and
  a data analysis network element, configured to send the second service type information of the data flow.

* * * * *

UNITED STATES PATENT AND TRADEMARK OFFICE
CERTIFICATE OF CORRECTION

| | | |
|---|---|---|
| PATENT NO. | : 12,022,320 B2 | |
| APPLICATION NO. | : 17/986219 | |
| DATED | : June 25, 2024 | |
| INVENTOR(S) | : Yang Xin et al. | |

It is certified that error appears in the above-identified patent and that said Letters Patent is hereby corrected as shown below:

In the Claims

In Column 30, Line 63, in Claim 16, delete "comprises:" and insert -- comprise: --.

Signed and Sealed this
Third Day of September, 2024

Katherine Kelly Vidal
*Director of the United States Patent and Trademark Office*